(12) United States Patent
Takahashi et al.

(10) Patent No.: US 12,067,966 B2
(45) Date of Patent: Aug. 20, 2024

(54) INFORMATION PROCESSING APPARATUS AND INFORMATION PROCESSING METHOD

(71) Applicant: SONY GROUP CORPORATION, Tokyo (JP)

(72) Inventors: Kei Takahashi, Tokyo (JP); Junichi Shimizu, Tokyo (JP); Junichi Nagahara, Tokyo (JP); Manabu Fujiki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 376 days.

(21) Appl. No.: 17/413,877

(22) PCT Filed: Oct. 30, 2019

(86) PCT No.: PCT/JP2019/042656
§ 371 (c)(1),
(2) Date: Jun. 14, 2021

(87) PCT Pub. No.: WO2020/129422
PCT Pub. Date: Jun. 25, 2020

(65) Prior Publication Data
US 2022/0059070 A1 Feb. 24, 2022

(30) Foreign Application Priority Data
Dec. 20, 2018 (JP) .................. 2018-238714

(51) Int. Cl.
*G10K 15/04* (2006.01)
*B25J 9/00* (2006.01)
(Continued)

(52) U.S. Cl.
CPC ............ *G10K 15/04* (2013.01); *B25J 9/0015* (2013.01); *B25J 11/0005* (2013.01); *G10K 9/12* (2013.01)

(58) Field of Classification Search
USPC ..... 340/384.5, 286.07, 286.03, 309.4, 309.6, 340/293, 328, 330, 332, 815.48, 815.79,
(Continued)

(56) References Cited

U.S. PATENT DOCUMENTS 4,588,383 A * 5/1986 Parker .................. G09B 23/288
601/41
5,119,423 A * 6/1992 Shiraki ............... G10L 19/0212
704/223
(Continued)

FOREIGN PATENT DOCUMENTS

JP 2000-074687 A 3/2000
JP 2005-165778 A 6/2005
(Continued)

OTHER PUBLICATIONS

International Search Report and Written Opinion of PCT Application No. PCT/JP2019/042656, issued on Dec. 24, 2019, 10 pages of ISRWO.

*Primary Examiner* — Daniel Previl
(74) *Attorney, Agent, or Firm* — CHIP LAW GROUP

(57) ABSTRACT

An information processing apparatus including a controller that controls, based on a detected state of the apparatus, outputting of sound that is performed by the apparatus, wherein the controller sequentially changes, according to an amount of change in the state, a mode of outputting a synthetic sound that can be output by the apparatus in a normal state is provided. Furthermore, an information processing method including, by a processor, based on a detected state of an apparatus, controlling outputting of sound that is performed by the apparatus, wherein the
(Continued)

controlling includes, according to an amount of change in the state, sequentially changing a mode of outputting a synthetic sound that can be output by the apparatus in a normal state is provided.

20 Claims, 15 Drawing Sheets

(51) Int. Cl.
  *B25J 11/00* (2006.01)
  *G10K 9/12* (2006.01)
(58) Field of Classification Search
  USPC .................................. 340/384.73, 384.4
  See application file for complete search history.

(56) References Cited

U.S. PATENT DOCUMENTS

| | | | | |
|---|---|---|---|---|
| 5,555,310 | A | * | 9/1996 | Minami ............... H04H 20/88 379/406.06 |
| 5,816,885 | A | * | 10/1998 | Goldman ............... A63H 3/28 446/302 |
| 6,183,337 | B1 | * | 2/2001 | Beckman ............... A63H 3/28 446/302 |
| 2003/0093182 | A1 | * | 5/2003 | Yokoyama ............. G06N 3/126 700/248 |
| 2005/0043622 | A1 | * | 2/2005 | Jensen ................ G01S 15/8915 600/407 |
| 2008/0183473 | A1 | * | 7/2008 | Nagano ................... G10L 13/07 704/E13.011 |
| 2010/0007665 | A1 | * | 1/2010 | Smith ..................... G06T 13/40 345/473 |
| 2012/0097488 | A1 | * | 4/2012 | Taiana ................... B66B 1/468 187/395 |
| 2012/0103729 | A1 | * | 5/2012 | Finschi .................. B66B 1/468 187/247 |
| 2015/0251665 | A1 | * | 9/2015 | Shenoy .................. G01S 19/13 701/1 |
| 2018/0208196 | A1 | * | 7/2018 | Kurata ................... G08G 1/165 |

FOREIGN PATENT DOCUMENTS

| | | |
|---|---|---|
| JP | 2007-184834 A | 7/2007 |
| JP | 2008217684 A | 9/2008 |
| JP | 2015023989 A | 2/2015 |
| JP | 2018-163614 A | 10/2018 |

* cited by examiner

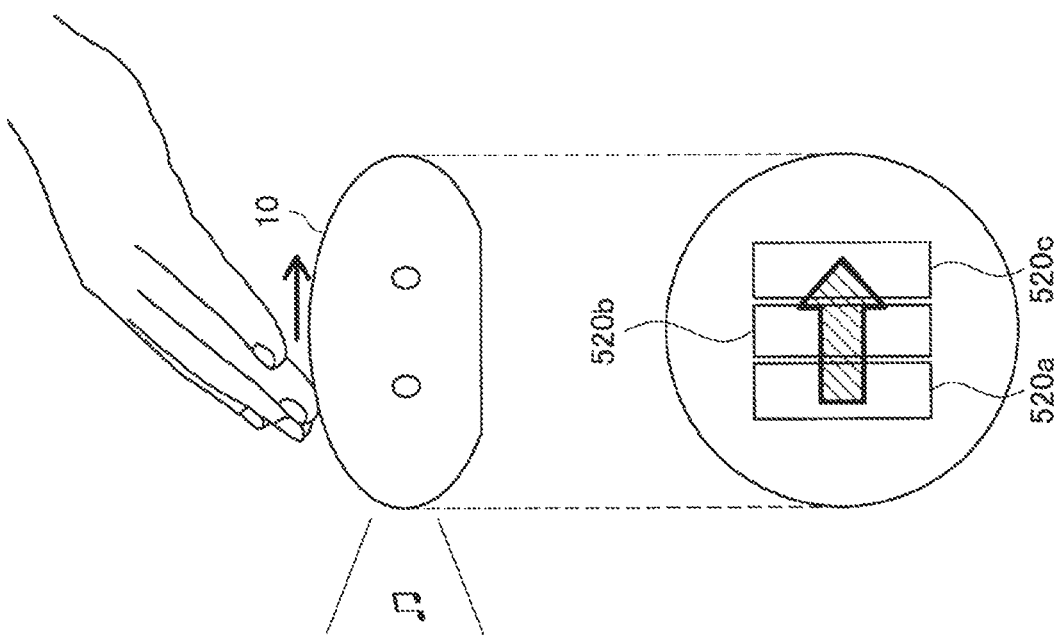
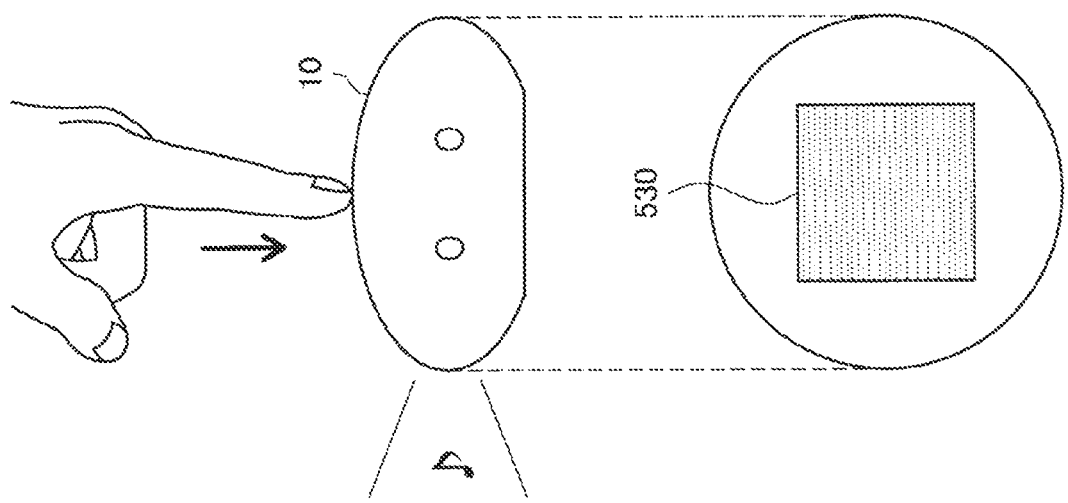
FIG.5

FIG.6
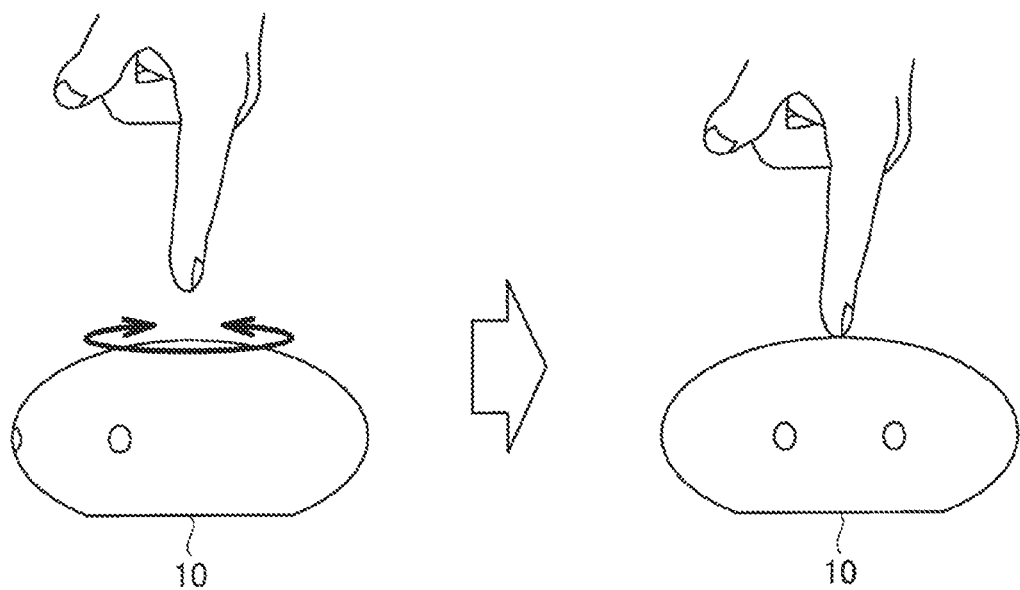
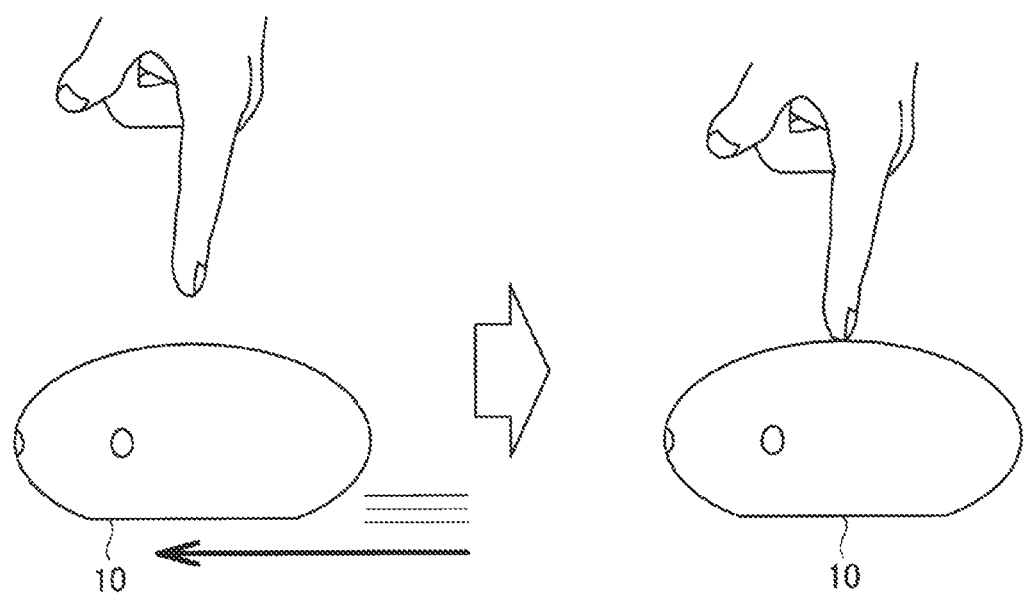

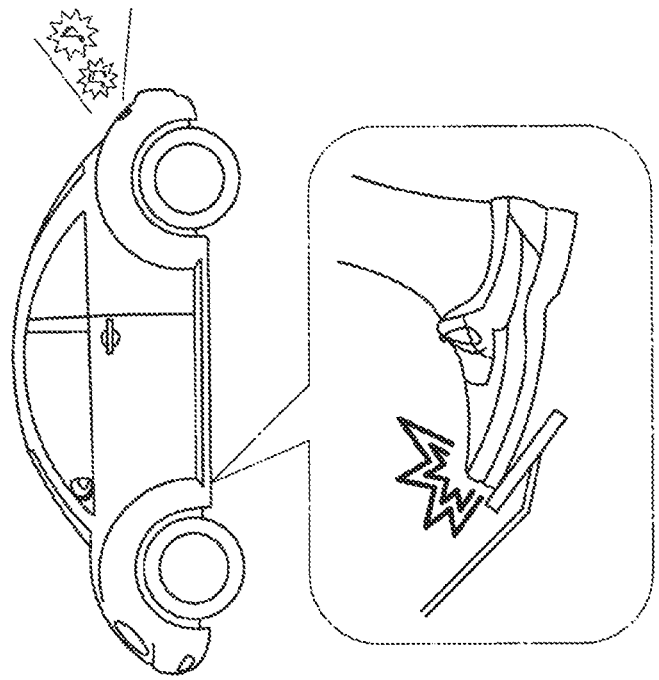
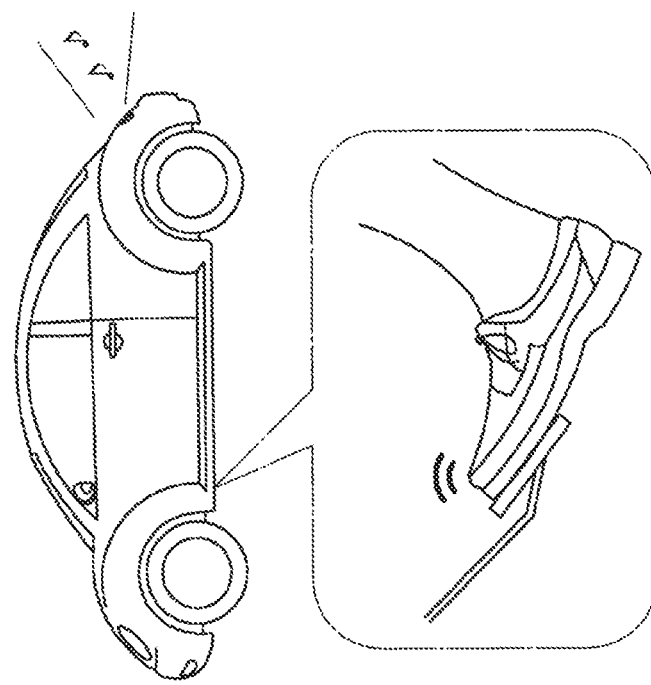
FIG.9

FIG.10
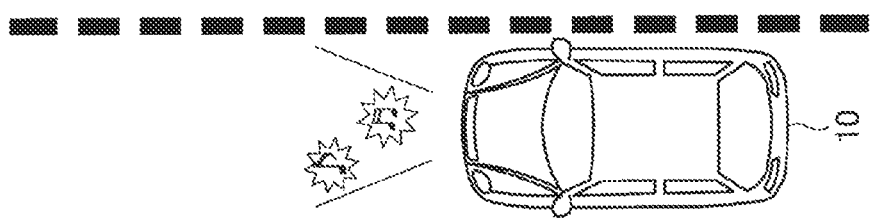
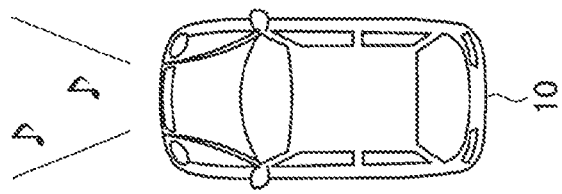

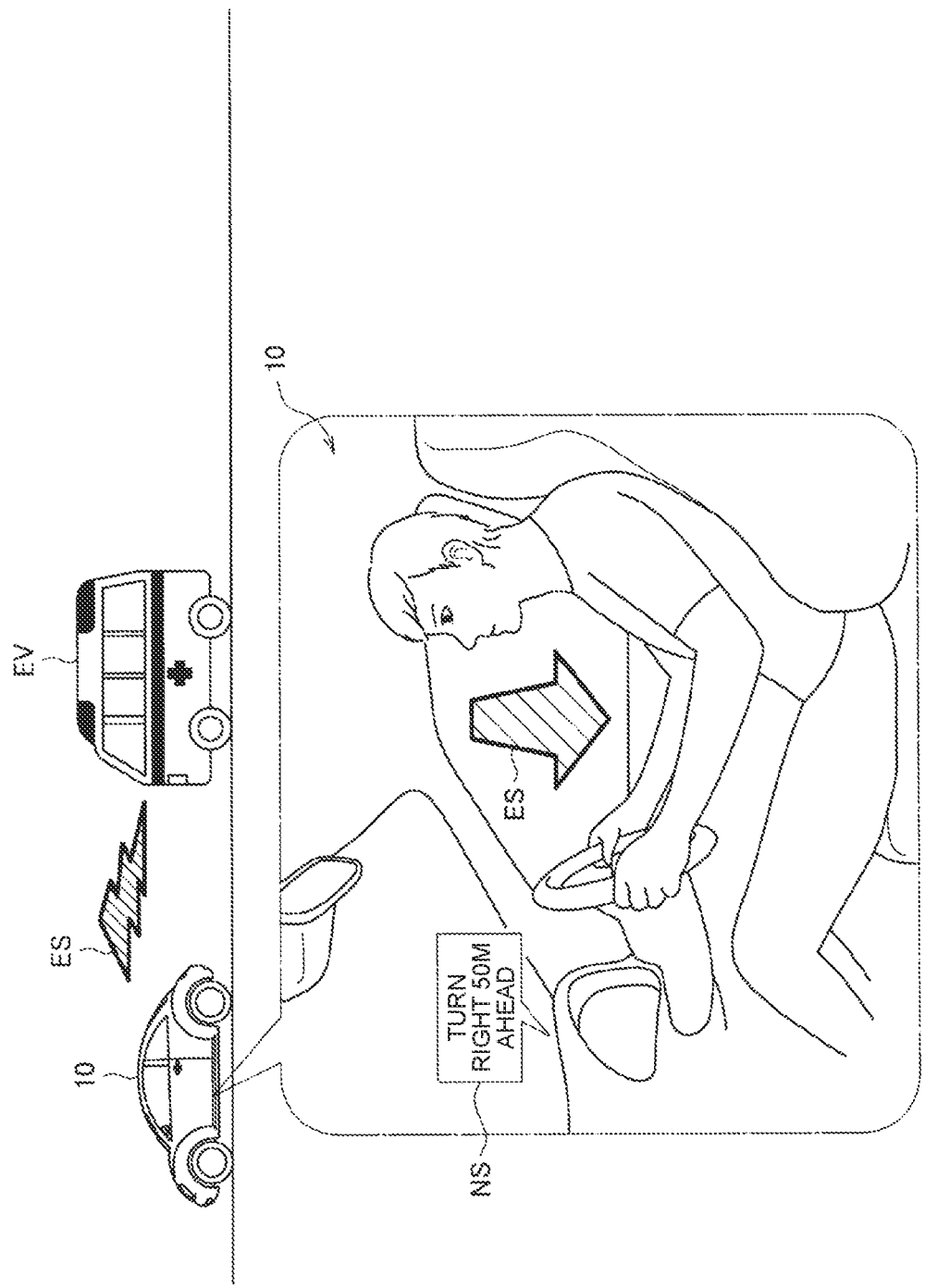

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/042656 filed Oct. 30, 2019, which claims priority benefit of Japanese Patent Application No. JP 2018-238714 filed in the Japan Patent Office on Dec. 20, 2018. Each of the above-referenced applications is hereby incorporated herein by reference in its entirety.

FIELD

The present disclosure relates to an information processing apparatus, an information processing method, and a program.

BACKGROUND

In recent years, various apparatuses that output sounds based on electric control have been widespread. Apparatuses that control output of sound based on collected sensor information have been also developed. For example, Patent Literature 1 discloses an electronic device that detects moves of an apparatus with an acceleration sensor and outputs multiple sounds.

CITATION LIST

Patent Literature

Patent Literature 1: JP 2007-184834 A

SUMMARY

Technical Problem

In the case where output sound is controlled based on the state of the apparatus, when a different type of sound from that in a normal state is output based on detection of a given state, the case where it sounds unnatural is also assumed depending on the use or concept of the apparatus.

Solution to Problem

According to the present disclosure, an information processing apparatus is provided that includes a controller configured to, based on a detected state of the apparatus, control outputting of sound that is performed by the apparatus, wherein the controller is configured to, according to an amount of change in the state, sequentially change a mode of outputting a synthetic sound that can be output by the apparatus in a normal state.

Moreover, according to the present disclosure, an information processing method is provided that includes: by a processor, based on a detected state of an apparatus, controlling outputting of sound that is performed by the apparatus, wherein the controlling includes, according to an amount of change in the state, sequentially changing a mode of outputting a synthetic sound that can be output by the apparatus in a normal state.

Moreover, according to the present disclosure, a program is provided that causes a computer to function as an information processing apparatus including a controller configured to, based on a detected state of the apparatus, control outputting of sound that is performed by the apparatus, wherein the controller is configured to, according to an amount of change in the state, sequentially change a mode of outputting a synthetic sound that can be output by the apparatus in a normal state.

BRIEF DESCRIPTION OF DRAWINGS

FIG. 5 is a diagram for explaining synthetic sound outputting control according to a type of behavior of a user according to the embodiment.

FIG. 6 is a diagram for explaining action stop control associated with detection of contact according to the embodiment.

FIG. 9 is a diagram for explaining synthetic engine sound outputting mode control based on an amount of change in load on a mobile object according to the embodiment.

FIG. 10 is a diagram for explaining the synthetic engine sound outputting mode control based on an amount of change in safety of the mobile object according to the embodiment.

FIG. 12B is a diagram for explaining the environment sound superimposition control according to approach of the subject according to the embodiment.

DESCRIPTION OF EMBODIMENTS

Figure 1:
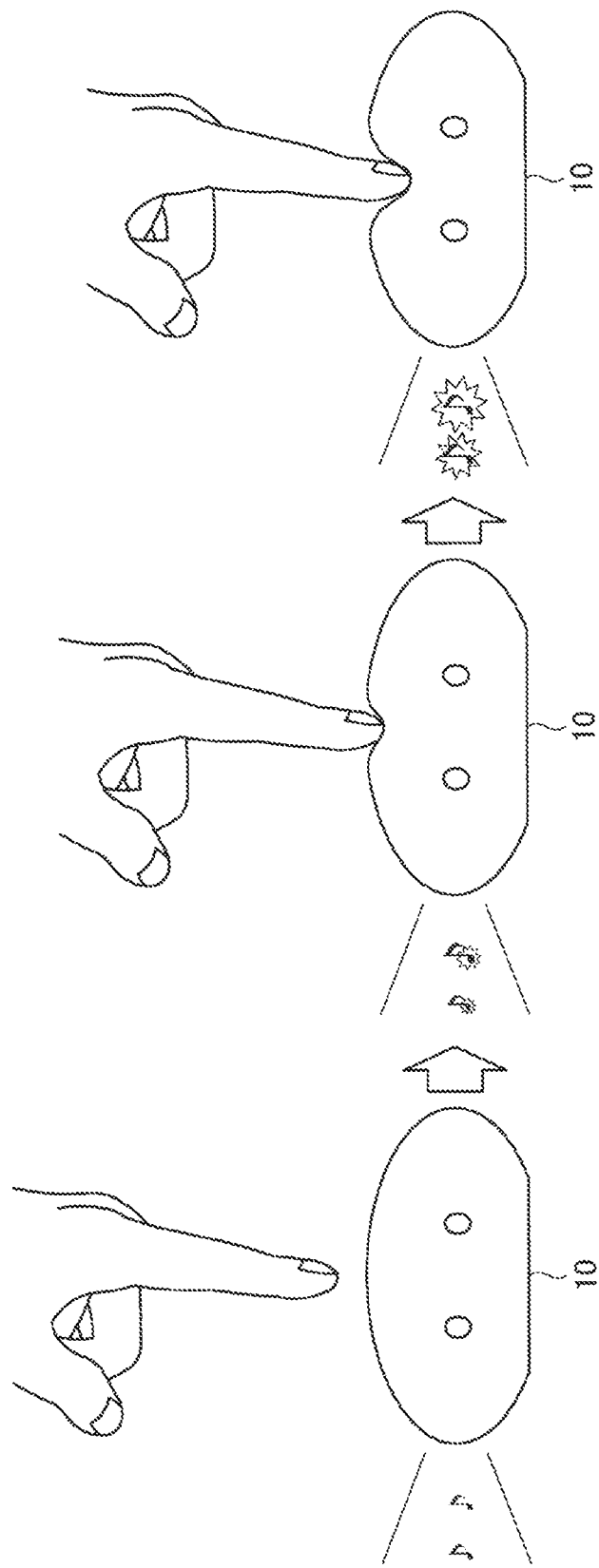
FIG. 1 is a diagram for explaining an overview of an embodiment of the disclosure.

With reference to the accompanying drawings, preferable embodiments of the disclosure will be described in detail below. In the description and drawings, components that have substantially the same functional configuration are denoted with the same number and redundant description thereof is omitted.

Description will be given in the following order.
1. First Embodiment
    1.1. Overview
    1.2. Example of Physical Configuration of Information Processing Apparatus 10
    1.3. Example of Functional Configuration of Information Processing Apparatus 10
    1.4. Details of Function
    1.5. Generation of Synthetic Sound
    1.6. Examples of Application
2. Example of Hardware Configuration
3. Summary

1. First Embodiment

1.1. Overview

First of all, an overview of an embodiment of the disclosure will be described. As described above, in recent years, various apparatuses that output sounds based on electric control have been widespread. Such apparatuses includes one that controls sounds to be output based on collected sensor information as the apparatus according to Patent Literature 1 does.

For example, the case where some sort of alert or warning is made according to the detected state of the apparatus is assumed. In this case, for example, increasing the effect of appeal to the user by using a special beep that is not output in the normal state is also considered.

Depending on the use or concept of the apparatus, the case where the aforementioned beep output may sound unnatural is also assumed.

For example, in the case of a robot apparatus imitating a living matter, in general, sounds in a form according to a concept (for example, voice of a young female or dog yelp) are output in a normal state. On the other hand, when a mechanical beep is output according to the fact that the robot apparatus enters a given state, there is a possibility that the aforementioned concept will be countered and the user will be made feel uncomfortable extremely or feel embarrassed more than necessary.

The technical idea according to the embodiment of the disclosure was reached with the focus on the above-described aspect and enables the user to perceive the state of the apparatus by making more natural sound output. To do so, an information processing apparatus 10 according to the embodiment of the disclosure includes a controller 130 that controls outputting of sound that is performed by the apparatus based on the detected state of the apparatus. The controller 130 according to the embodiment of the disclosure has a characteristic in, according to an amount of change in the state, sequentially changing the mode of outputting a synthetic sound that can be output when the apparatus is in the normal state.

The synthetic sound that can be output in the normal state may be, for example, in the case of the above-described robot apparatus, a non-verbal sound or a verbal sound in a form according to the concept. In other words, the controller 130 according to the embodiment is able to let the user know the state of the apparatus more naturally by, instead of the beep, sequentially changing the mode of outputting voice or yelp that is made by the robot apparatus routinely.

FIG. 1 is a diagram for explaining the overview of the embodiment. FIG. 1 illustrates an example of the case where the information processing apparatus 10 according to the embodiment is a robot apparatus imitating a virtual living matter. For example, as illustrated in FIG. 1, the information processing apparatus 10 according to the embodiment may be a robot apparatus that has a shape close to an oval and that communicates with a user via non-verbal sound and autonomous actions. By dynamically changing various parameters relating to a FM (Frequency Modulation) sound source, the information processing apparatus 10 according to the embodiment is able to express sounds of various emotions as if a living matter speaks although the sounds are non-verbal language.

A flexible material, such as silicon resin, may be used for part of the exterior of the information processing apparatus 10 according to the embodiment. In the case of the example illustrated in FIG. 1, a flexible material is used for the whole exterior of the information processing apparatus 10 excluding the bottom part. This allows the information processing apparatus 10 according to the embodiment to flexibly change its shape according to the contact made by the user (for example, picking or pinching).

There is, however, a risk that, because there are various parts inside the exterior, the internal parts would be damaged depending on the intensity of such contact as the aforementioned one. For example, arranging a solid structure inside makes it possible to prevent damage of parts associated with excessive deformation. In this case, however, because the feature of the flexible material that is originally deformable flexibly is offset and the treating feeling of the user is lost, a measure to stop the user treating the information processing apparatus 10 before the user deforms the information processing apparatus 10 to the utmost limit is required. For this reason, when a load on the apparatus that cannot be ignored, such as damage of a part, is detected because of a behavior of the user, such as contact, the information processing apparatus 10 according to the embodiment may implicitly notify the user of the status of load on the apparatus by sequentially changing the synthetic sound outputting mode.

In the case of the example illustrated in FIG. 1, when the exterior deforms because of contact by the user from the normal state illustrated on the left to that illustrated at the center, the controller 130 according to the embodiment dynamically and sequentially changes a synthetic sound, that is, a sound that evokes yelp based on the amount of change in the load that is associated with the contact.

The synthetic sound outputting mode according to the embodiment, for example, includes timbre, tone, and acoustic pressure. The controller 130, for example, is able to change the timbre by controlling the frequency relating to the synthetic sound. Such control makes it possible to express that the information processing apparatus 10 is pain in response to the contact made by the user and inhibit the user from making excessive contact.

When the amount of change in the load resulting from contact made by the user has reached a predetermined threshold (that can be referred to as a limit below), the controller 130 according to the embodiment outputs a synthetic sound in an outputting mode corresponding to the threshold as illustrated on the right in the drawing. In this case, the controller 130 may, for example, output a synthetic sound that evokes a scream.

The above-described control performed by the controller 130 according to the embodiment makes it possible to enable the user to more naturally and instinctively perceive the limit of the load on the apparatus than when a special beep is output.

1.2. Example of Physical Configuration of Information Processing Apparatus 10

Figure 2:
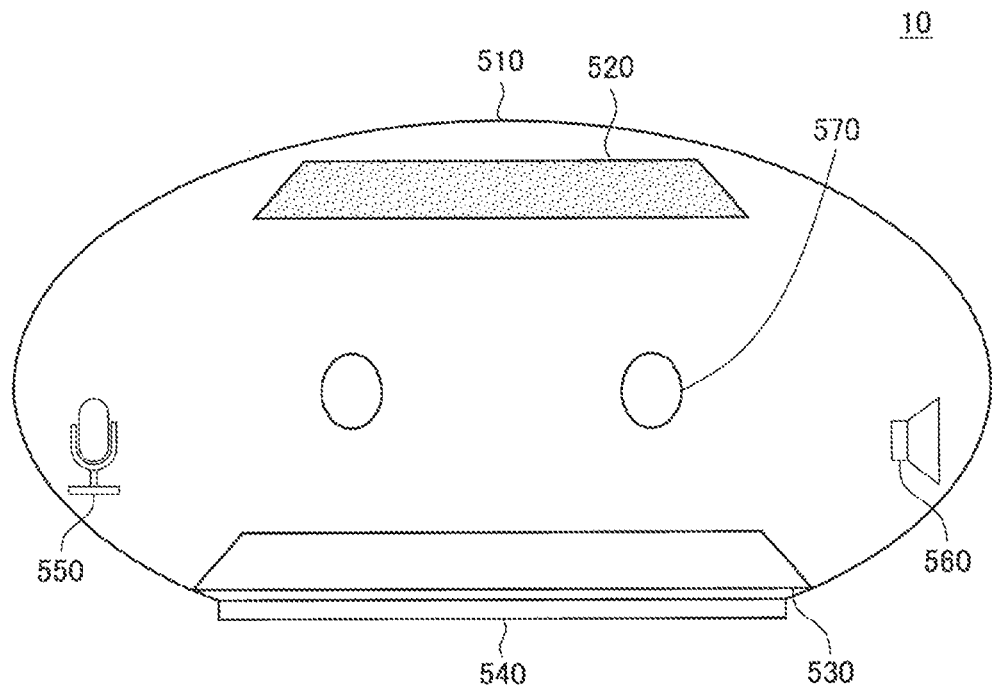
FIG. 2 is a diagram schematically illustrating an example of a physical configuration of an information processing apparatus according to the embodiment.

An example of a physical configuration of the information processing apparatus 10 according to the embodiment will be described next. FIG. 2 is a diagram schematically illustrating the example of the physical configuration of the information processing apparatus 10 according to the embodiment. As illustrated in FIG. 2, the information processing apparatus 10 according to the embodiment includes a deformable structure 510, a capacitance sensor 520, a pressure sensor 530, an actuator 540, a microphone 550, a speaker 560, and a light source 570.

Deformable Structure 510

The deformable structure 510 according to the embodiment is a structure whose shape changes according to an external force. The deformable structure 510 according to the embodiment is, for example, realized by the above-described flexible material. The deformable structure 510 according to the embodiment may contain a joint, etc. The information processing apparatus 10 according to the embodiment has a characteristic in having the deformable structure 510 in at least part of the exterior. In this case, the controller 130 according to the embodiment dynamically controls the synthetic sound outputting mode according to an amount of change in the load on the apparatus that is associated with contact with the deformable structure 510 that is made by the user.

Capacitance Sensor 520

The capacitance sensor 520 according to the embodiment detects contact made by the user, such as stroking. Detection of contact performed by the capacitance sensor 520 according to the embodiment will be described in detail below separately.

Pressure Sensor 530

The pressure sensor 530 according to the embodiment detects contact in a top-down direction made by the user. The pressure sensor 530 according to the embodiment, for example, is capable of detecting contact made by the user, such as pushing by a finger. Such contact as the aforementioned one is a motion that applies a force toward the bottom of the information processing apparatus 10 and thus the pressure sensor 530 according to the embodiment may be arranged near the bottom of the information processing apparatus 10. The arrangement makes it possible to easily detect contact in the top-down direction made by the user without arranging a sensor according to the oval shape.

Actuator 540

The actuator 540 according to the embodiment is configured to realize move and rotation motion of the information processing apparatus 10.

Microphone 550

The microphone 550 according to the embodiment detects sound, such as speech of the user. The information processing apparatus 10 is capable of take an action or output sound in response to speech of the user that is detected by the microphone 550.

Speaker 560

The speaker 560 according to the embodiment outputs a synthetic sound based on the control of the controller 130.

Light Source 570

The light source 570 according to the embodiment emits light based on the control of the controller 130. The light source 570 is implemented by, for example, an LED. The light source 570 according to the embodiment may be, for example, as illustrated in the drawing, has a configuration corresponding to the eyes of the information processing apparatus 10.

The representative example of the physical configuration of the information processing apparatus 10 according to the embodiment has been described. Note that the configuration illustrated in FIG. 2 is an example only and the information processing apparatus 10 according to the embodiment includes, in addition to the configuration described above, another configuration of, for example, a processor, or the like. The physical configuration of the information processing apparatus 10 according to the embodiment can be flexibly modified according to the specification.

1.3. Example of Functional Configuration of Information Processing Apparatus 10

Figure 3:
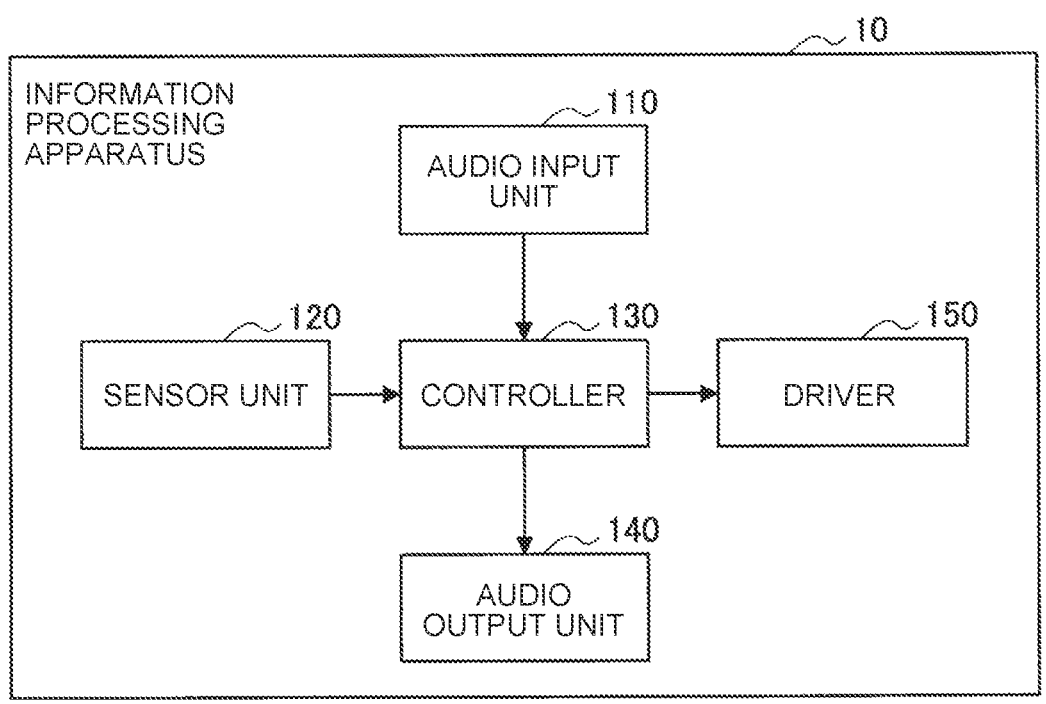
FIG. 3 is a block diagram illustrating an example of a functional configuration of the information processing apparatus according to the embodiment.

An example of a functional configuration of the information processing apparatus 10 according to the embodiment will be described. FIG. 3 is a block diagram illustrating the example of the functional configuration of the information processing apparatus 10 according to the embodiment. As illustrated in FIG. 3, the information processing apparatus 10 according to the embodiment includes an audio input unit 110, a sensor unit 120, the controller 130, an audio output unit 140, and a driver 150.

Audio Input Unit 110

The audio input unit 110 according to the embodiment collects speech of the user and environment sounds. To do so, the audio input unit 110 according to the embodiment includes the microphone 550.

Sensor Unit 120

The sensor unit 120 according to the embodiment collects various types of sensor information. To do so, the sensor unit 120 according to the embodiment includes, for example, the capacitance sensor 520 and the pressure sensor 530. The sensor unit 120 according to the embodiment may include a barometric pressure sensor or a displacement sensor. The sensor unit 120 according to the embodiment can include various sensors corresponding to subjects to be sensed.

Controller 130

The controller 130 according to the embodiment controls each configuration that the information processing apparatus 10 includes. The controller 130 according to the embodiment is implemented by a processor, such as a CPU.

The controller 130 according to the embodiment controls outputting of sound performed by the audio output unit 140 based on the state of the information processing apparatus 10 that is detected by, for example, the sensor unit 120. In this case, the controller 130 according to the embodiment has a characteristic in, according to an amount of change in the state, dynamically changing the mode of outputting the synthetic sound that can be output when the information processing apparatus 10 is in the normal state. Details of the function that the controller 130 according to the embodiment has will be described below separately.

Audio Output Unit 140

The audio output unit 140 according to the embodiment outputs a synthetic sound based on the control of the controller 130. To do so, the audio output unit 140 according to the embodiment includes, for example, the speaker 560 and an amplifier.

Driver 150

The driver 150 according to the embodiment takes various actions based on the control of the controller 130. To do so, the driver 150 according to the embodiment, for example, includes an actuator.

The example of the functional configuration of the information processing apparatus 10 according to the embodiment has been described. The configuration illustrated in FIG. 3 is an example only and the functional configuration of the information processing apparatus 10 according to the embodiment is not limited to the example. For example, the information processing apparatus 10 according to the embodiment may further include a display unit that displays various types of visual information and an imaging unit that captures an image of the user. The controller 130 according to the embodiment may be implemented as a device separately from other configurations described above. In this case, the controller 130 receives sound information and sensor information via a network and remotely control the audio output unit 140 and the driver 150. The functional configuration of the information processing apparatus 10 according to the embodiment can be flexibly modified according to the specification and operation.

1.4. Details of Function

The function that the controller 130 according to the embodiment has will be described in detail next. As described above, the controller 130 according to the embodiment, for example, has a characteristic in, based on an amount of change in the load on the information processing apparatus 10 that changes because of contact made by the user, dynamically and sequentially changing the mode of outputting a synthetic sound to be output by the audio output unit 140. The characteristic makes it possible to enable the user to more naturally and instinctively perceive the state of the apparatus.

Figure 4:
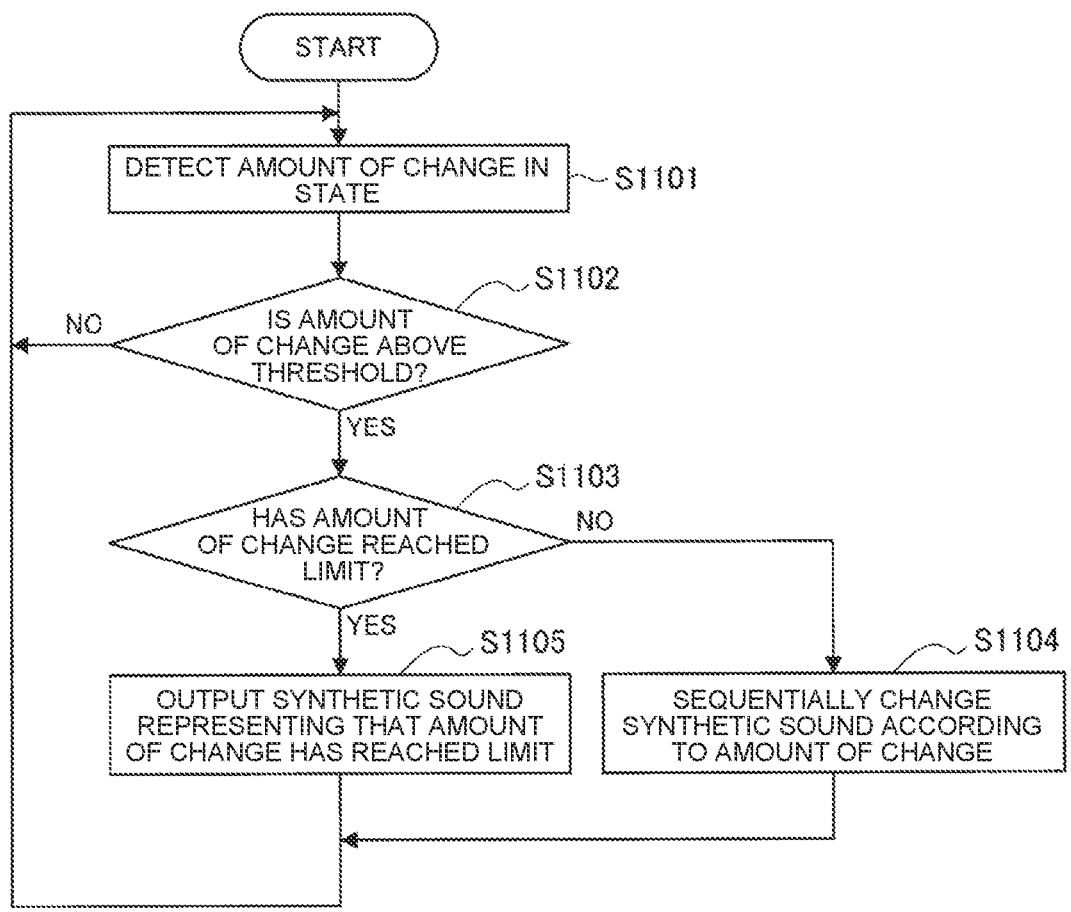
FIG. 4 is a flowchart representing a flow of outputting mode control according to an amount of change in a state according to the embodiment.

In this case, the information processing apparatus 10 according to the embodiment performs the process in such a flow as that represented in FIG. 4. FIG. 4 is a flowchart representing the flow of outputting mode control according to an amount of change in the state according to the embodiment.

Referring to FIG. 4, first of all, the sensor unit 120 detects an amount of change in the state of the information processing apparatus 10 (S1101). As described above, the aforementioned state contains the load on the information processing apparatus 10 that changes because of a behavior of a user. The sensor unit 120 may detect an amount of pushing by the user that is detected by the pressure sensor 530 as the aforementioned amount of change in the load.

The controller 130 then determined whether the amount of change that is detected at step S1101 is fixed at the threshold (S1102).

When the amount of change is at or under the threshold (S1102: NO), the information processing apparatus 10 returns to step S1101 and repeatedly executes detecting an amount of change.

On the other hand, when the amount of change is above the threshold (S1102: YES), the controller 130 subsequently determines whether the amount of change has reached the limit (S1103). The limit may be a value corresponding to a maximum load allowable by the information processing apparatus 10. For example, in the case of load resulting from pushing by the user, an amount of pushing (pressure) that can cause a damage in a structure, such as the capacitance sensor 520 that is arranged in the deformable structure 510, may be set for the limit.

When the amount of change has not reached the limit (S1103: NO), the controller 130 identifies and sequentially changes a synthetic sound to be output by the audio output unit 140 according to the amount of change (S1104).

On the other hand, when the amount of change has reached the limit (S1103: YES), the controller 130 causes the audio output unit 140 to output a synthetic sound representing that the amount of change has reached the limit (S1105). In other words, the controller 130 outputs a synthetic sound in an outputting mode corresponding to the limit, such as the aforementioned scream.

After the process at step S1104 or S1105, the information processing apparatus 10 returns to step S1101 and repeatedly executes the above-described process.

The flow of the outputting mode control according to an amount of change in the state, such as the load on the apparatus, according to the embodiment has been described in detail. The amount of change in the state according to the embodiment is not limited to the load on the apparatus and includes, for example, an amount of treating by the user, such as stroking or touching, and other various states. Control on the synthetic sound outputting mode according to a behavior of the user according to the embodiment will be described next. The controller 130 according to the embodiment is capable of, according to a behavior of the user that is detected by the sensor unit 120, controlling the mode of outputting a synthetic sound to be output by the audio output unit 140. For example, the controller 130 according to the embodiment may output a synthetic sound in a different outputting mode according to the type and intensity of a detected behavior or the intensity.

FIG. 5 is a diagram for explaining control on the synthetic sound outputting mode according to the type of behavior of the user according to the embodiment. As described above, using the capacitance sensor 520 and the pressure sensor 530, the sensor unit 120 according to the embodiment is able to detect contact made by the user.

As illustrated on the left in the drawing, using the pressure sensor 530 that is arranged near the bottom of the information processing apparatus 10, the sensor unit 120 according to the embodiment is able to detect contact made by the user, such as pushing, in the top-down direction.

For example, as illustrated on the right in the drawing, using the capacitance sensor 520 that is arranged in the upper part of the information processing apparatus 10, the sensor unit 120 is able to detect contact made by the user, such as stroking. The information processing apparatus 10 according to the embodiment, for example, includes a plurality of capacitance sensors 520a to 520c that are parallel to one another as illustrated in the drawing. Such arrangement as the above-described one enables sequential detection of contact by the capacitance sensors 520, 520b and 520c, thereby enabling detection of shift of the area of contact from the left to the right, that is, stroking to the right.

Arrangement of the capacitance sensor 520 illustrated in FIG. 5 is an example only. The capacitance sensor 520 according to, for example, may be arranged in a lattice. The information processing apparatus 10 according to the embodiment may include a device of which sets of coordinates of contact are detectable, such as a touch panel, instead of the capacitance sensor 520.

As described above, the sensor unit 120 according to the embodiment is able to detect the type of contact made by the user by using a plurality of sensors. In this case, the controller 130 according to the embodiment may output a synthetic sound in a different outputting mode according to the type of contact that is detected by the sensor unit 120, or the like.

For example, the controller 130 may output synthetic sounds in different timbres, tones and acoustic pressures between the case where pushing is detected and the case where stroking is detected. The controller 130, for example, may output a synthetic sound in an outputting mode corresponding to unpleasantness when pushing is detected and may output a synthetic sound in an outputting mode corresponding to pleasantness when stroking behavior is detected.

The controller 130, for example, may control the synthetic sound outputting mode according to the speed or intensity of contact. In an example, the controller 130 may output a synthetic sound whose frequency is high when the speed of contact is relatively high and may output a synthetic sound whose frequency is low when the speed is relatively low.

The controller 130 is able to regard that the information processing apparatus 10 feels unpleasant when the speed of contact is too high and feels pleasant when the speed is low and output synthetic sounds in outputting modes corresponding to the respective cases.

Control on the synthetic sound outputting mode according to contact according to the embodiment has been described. The above-described function of the controller 130 according to the embodiment makes it possible to output synthetic sounds in various outputting modes according to the contact, give freshness to the user, and attract the interest of the user for a long time.

Action stop control associated with detection of contact according to the embodiment will be described. The controller 130 according to the embodiment may perform control on various actions implemented by the driver 150 in addition to the synthetic sound outputting control. In that case, the controller 130 according to the embodiment may cause the driver 150 to stop a given action based on the fact that contact made by the user is detected.

The information processing apparatus 10 according to the embodiment, for example, is capable of moving in the horizontal direction, making a top-down motion in the vertical direction, and making a rotation motion in the horizontal direction. When the user makes contact with the information processing apparatus 10 during such an action as the aforementioned one, depending on the type or speed of the action, the palm of the user, or the like, may move such that the palm is compulsorily deformed, which evokes an unpleasant emotion in the user. When the information processing apparatus 10 is a relatively large apparatus, the user may hurt or feel pain. In order to avoid such a situation, the controller 130 according to the embodiment may stop the action with a given direction of motion according to the direction in which contact made by the user is detected.

FIG. 6 is a diagram for explaining action stop control associated with detection of contact according to the embodiment. For example, in the upper part of the drawing, the case where pushing is performed, that is, contact in the top-down direction is made by the user when the information processing apparatus 10 is making a rotation motion in the horizontal direction is illustrated. In this case, because there is a possibility that the finger of the user would be deformed compulsorily because of the rotation motion of the information processing apparatus 10 depending on the position of pushing, the controller 130 may control the driver 150 to stop the rotation motion in order to prevent an unpleasant emotion from being evoked in the user.

In the lower part of the drawing, the case where pushing is performed, that is, contact in the top-down direction is made by the user when the information processing apparatus 10 is moving in the horizontal direction is illustrated. Also in this case, there is a possibility that the finger of the user would be deformed compulsorily because of the move of the information processing apparatus 10. For this reason, the controller 130 may control the driver 150 to stop the move in the horizontal direction in order to prevent an unpleasant emotion from being evoked in the user.

On the other hand, when the information processing apparatus 10 is making an upper-limit motion in the vertical direction, it is assumed that an unpleasant emotion is unlikely to be evoked in the user and the user is unlikely to be hurt also because the flexible material is used for the exterior. For this reason, the controller 130 according to the embodiment may keep causing the top-down motion to be executed.

The action stop control associated with detection of contact according to the embodiment has been described. As descried above, the controller 130 according to the embodiment makes it possible to secure safety of the user without evoking an unpleasant emotion in the user by stopping the action of the information processing apparatus 10 according to the direction of detection of contact and the direction of motion.

The types of action described above are an example only, and the stop control performed by the controller 130 is appropriately designed according to the weight and shape, material, and speed of motion of the information processing apparatus 10. The controller 130 according to the embodiment, for example, may perform control on actin feedback in response to contact, such as having the information processing apparatus 10 take an action of looking back to the user after pushing completes, or the like.

1.5. Generation of Synthetic Sound

Generation of a synthetic sound according to the embodiment will be described in detail next. As described above, the controller 130 according to the embodiment dynamically and sequentially changes the synthetic sound outputting mode according to an amount of change in the state of the information processing apparatus 10. In this case, the controller 130 is able to variously express an impression and emotional meaning of a synthetic sound by dynamically and sequentially changing various parameters relating to synthesis of an FM sound source.

Figure 7:
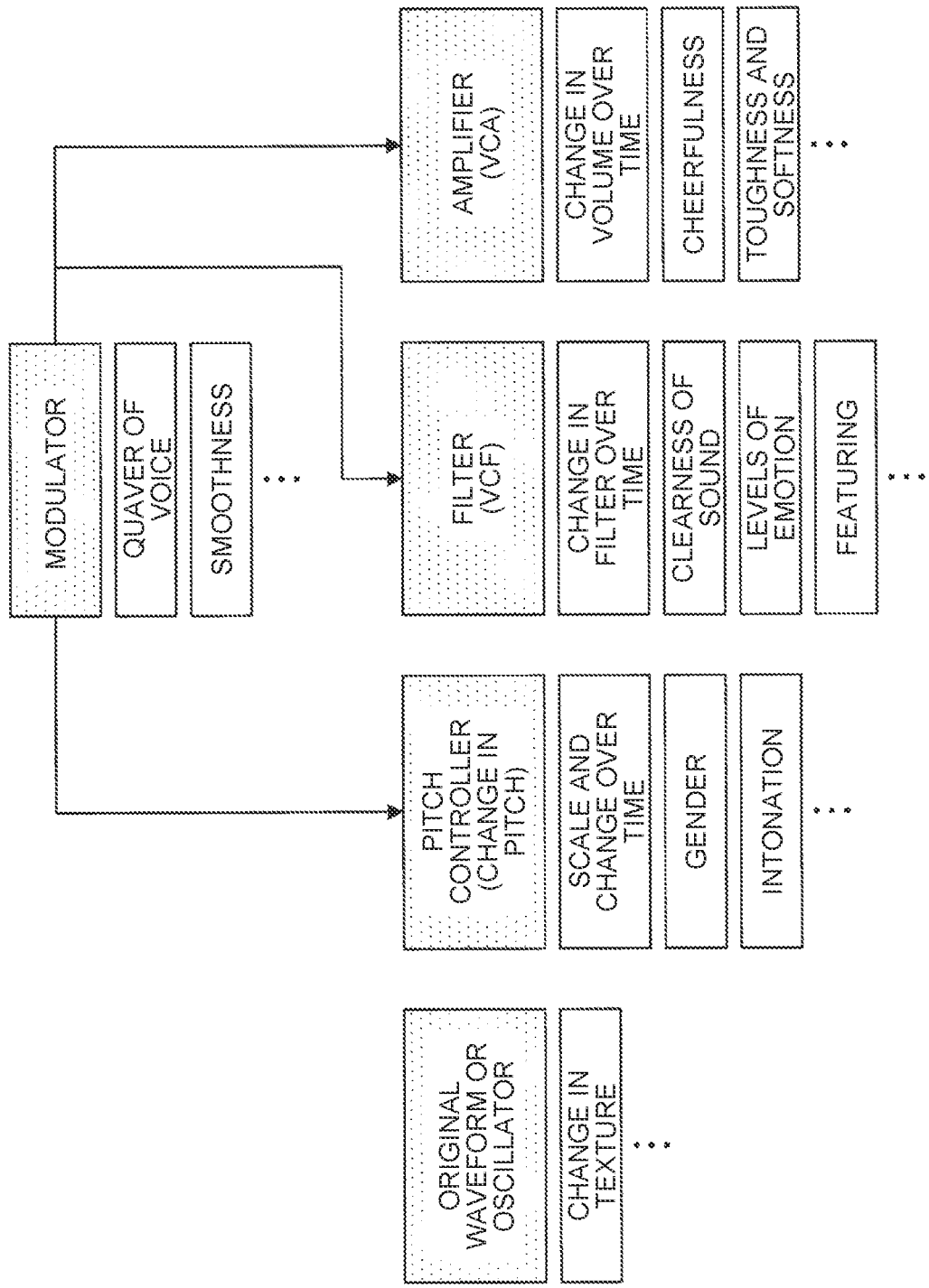
FIG. 7 is a diagram for explaining parameters relating to synthetic sounds according to the embodiment.

FIG. 7 is a diagram for explaining the parameters relating to synthetic sounds according to the embodiment. FIG. 7 represents relationships each between a configuration that a synthesizer that synthesizes an FM sound source includes and an outputting mode that is expressed by changing the parameter relating to each configuration.

The controller 130 is able to change the basic texture of sound by changing a parameter relating to an oscillator. In an example, sine waves can produce a soft impression and sawtooth waves can produce a sharp impression.

The controller 130 is able to produce levels of emotion, gender, and intonation by controlling a parameter of a pitch controller, that is, the pitch.

Figure 8:
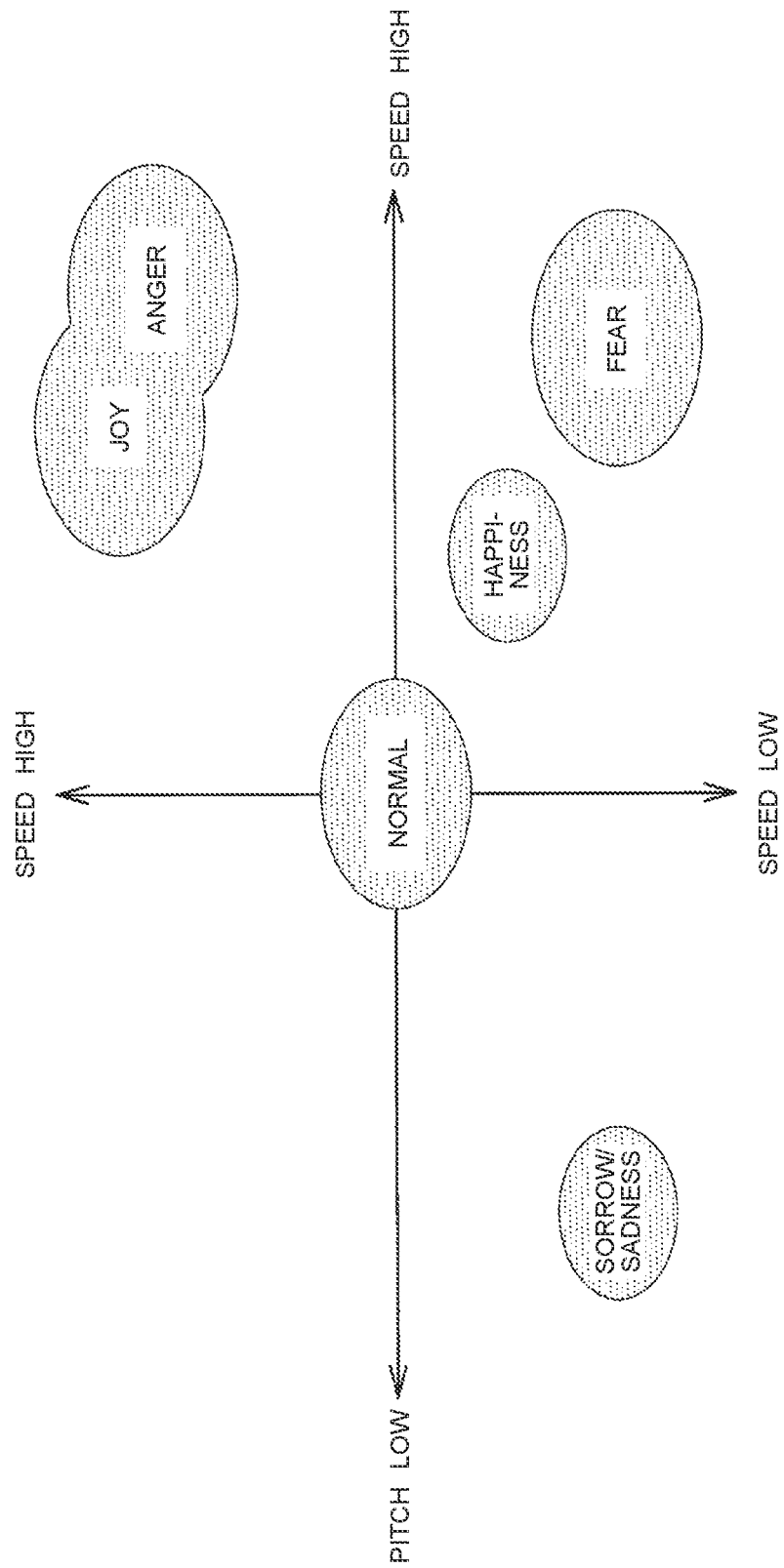
FIG. 8 is a diagram illustrating an example of emotions that can be expressed by controlling the pitch and speed according to the embodiment.

FIG. 8 is a diagram illustrating an example of emotions that can be expressed by controlling the pitch and speed according to the embodiment. The hatched areas in FIG. 8 represents the volume. It is known that the pitch and speed of sound strongly affects evoking of emotions by sound. The controller 130, for example, is able to produce the degree of joy or anger by setting the pitch and speed relatively high. On the contrary, it is possible to express sorrow by setting the pitch and speed relatively low. In this manner, the controller 130 according to the embodiment is able to produce various emotions and degrees of emotions by controlling the pitch and speed.

Description will be continued with reference to FIG. 7 again. The controller 130 is also able to express the clearness of sound (opening of the mouth) by controlling a parameter of a filter. The controller 130, for example, is able to produce muffled sound and open sound by increasing or lowering the frequency of a low-pass filter.

The controller 130 is also able to change the accent of volume and the impression of rise and end by changes in an amplifier over time.

The controller 130 may express quaver and smoothness of voice by controlling a parameter of a modulator.

As described above, the controller 130 according to the embodiment is able to variously express the impression and emotional meaning by changing each parameter relating to the oscillator, the modulator, the pitch controller, the filter or the amplifier.

1.6. Examples of Application

The basic function that the information processing apparatus 10 according to the embodiment has been described. In the description above, the case where the information processing apparatus 10 according to the embodiment is a robot apparatus imitating a living matter has been described as an example; however, the mode of the information processing apparatus 10 according to the embodiment is not limited to the example. The technical idea according to the embodiment is widely applicable to various apparatuses.

For example, the information processing apparatus 10 according to the embodiment may be a mobile object, such as a vehicle, and a device that is installed in the mobile object. FIG. 9 is a diagram for explaining synthetic engine sound outputting mode control based on an amount of change in load on a mobile object according to the embodiment.

For example, in the case of the example illustrated on the left in FIG. 9, a user is performing an operation of pushing the accelerator slowly in conformity with the current speed. Such an operation leads to improvement in fuel efficiency and thus the controller 130 may cause the audio output unit 140 to output a synthesis engine sound in a normal state.

On the other hand, in the case of the example illustrated on the left in FIG. 9, the user is performing an operation of rapidly pushing the accelerator strongly. When such an operation from which lowering the fuel efficiency stems is detected, the controller 130 estimates that a load is on the mobile object and dynamically and sequentially change the synthesis engine sound outputting mode. In this case, the controller 130, for example, may control the filter, thereby performing control to increase high-frequency components and output a synthesis engine sound with a sharp impression and increase the volume.

The state of the mobile object according to the embodiment is not limited to the load and may contain safety. FIG. 10 is a diagram for explaining the synthesis engine sound outputting mode control based on an amount of change in safety of the mobile object according to the embodiment.

For example, in the case of the example illustrated on the left in FIG. 10, the user is driving by steering such that the mobile object travels in the middle of the driving lane. In this case, the controller 130 may estimate that safety of the mobile object and the user is maintained and cause the audio output unit 140 to output the synthesis engine sound in the normal state.

On the other hand, in the case of the example illustrated on the right in FIG. 10, the mobile object is traveling in the vicinity of the center line. When driving having an effect of lowering the safety is detected as described above, the controller 130 dynamically and sequentially changes the synthetic sound outputting mode according to a degree of lowering of the safety (for example, the degree of vicinity to the center line). The controller 130, for example, may cause the audio output unit 140 to output a synthesis engine sound that evokes anger or fear by changing the pitch.

The state of the mobile object according to the embodiment may contain the position of the mobile object. More specifically, the controller 130 according to the embodiment may dynamically change the sound of synthetic sound to be output according to an amount of change in a relative position between a specified place, such as a destination, and the mobile object.

Figure 11:
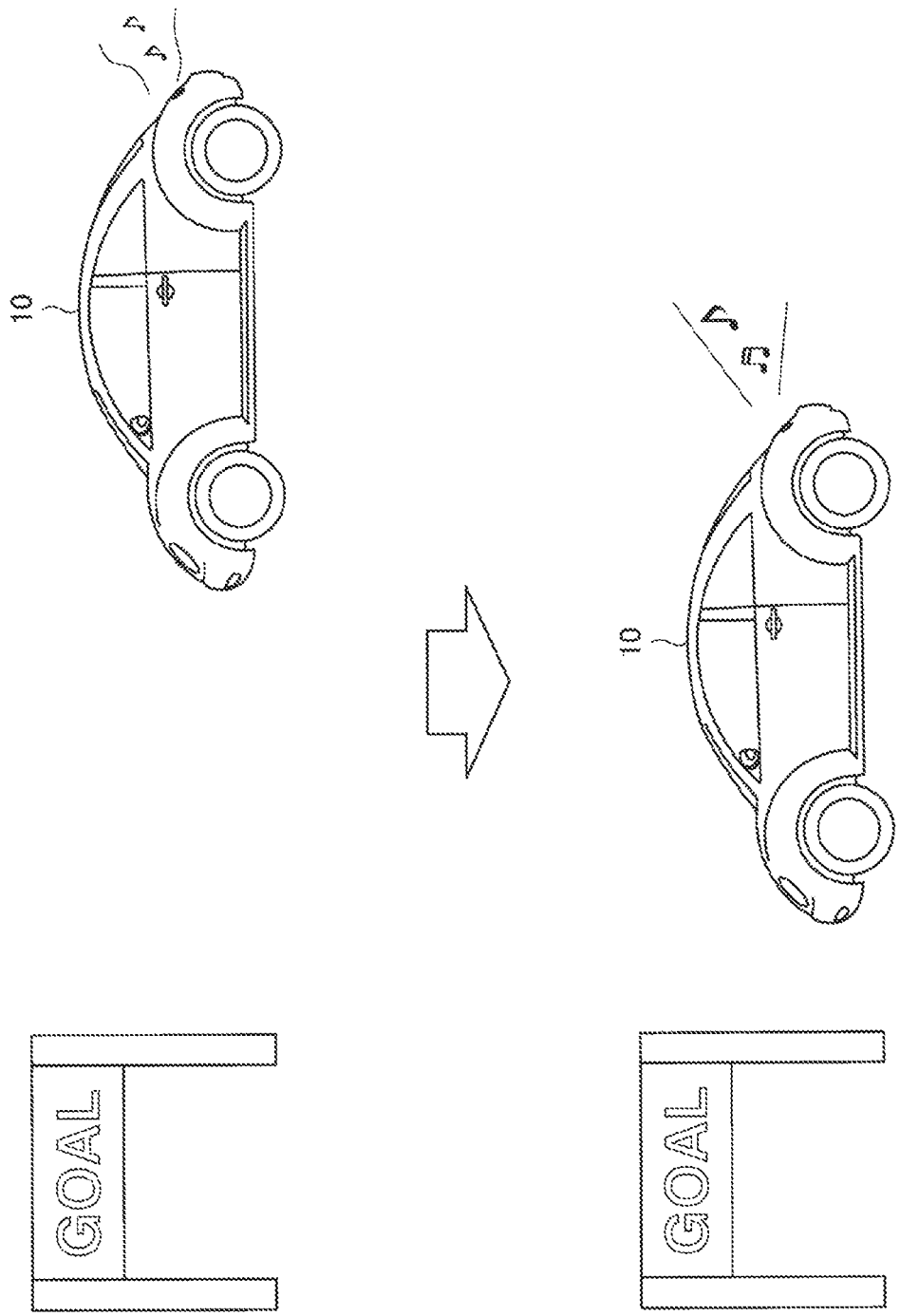
FIG. 11 is a diagram for explaining synthetic sound outputting mode control based on an amount of change in a relative position according to the embodiment.

FIG. 11 is a diagram for explaining synthetic sound outputting mode control based on an amount of change in the relative position according to the embodiment. In the upper part in FIG. 11, the situation in which the mobile object is traveling an area that is relatively distant from a destination that is registered as a specified place is illustrated. In this case, the controller 130 may cause the audio output unit 140 to output the synthesis engine sound and navigation sound in the normal state.

On the other hand, in the lower part in FIG. 11, the situation in which the mobile object is approaching the destination is illustrated. In this case, the controller 130 according to the embodiment may dynamically and sequentially control the mode of outputting synthesis engine sound or navigation sound based on the fact that the relative distance between the destination and the mobile object approaches a threshold. The controller 130, for example, may perform control to increase the volume or output soft sound or comfortable sound.

The controller 130 may control the outputting mode also when the mobile object moves away from the destination. In this case, the controller 130 may perform control to reduce the volume or output more sharp sound. The controller 130 is able to perform similar control also when the time of arrival at the destination runs behind because of making a stop, or the like.

The example of the outputting mode control in the case where the information processing apparatus 10 according to the embodiment is implemented as a mobile object and a device that is installed in the mobile object has been described. The synthetic sound according to the embodiment may be generated based on and event other than environment sound and a subject of operation. The controller 130 according to the embodiment may change the synthetic sound outputting mode according to a difference of the event of subject.

The controller 130 according to the embodiment may cause the audio output unit 140 to output a synthetic sound that induces an objective operation. For example, when the mobile object turns left on the road, the controller 130 is able to perform control to increase a synthesis turn signal sound and a synthesis engine sound as the mobile object approaches an intersection.

Furthermore, the controller 130 according to the embodiment is able to control a haptic feedback outputting mode. In the case of a mobile object, the aforementioned haptic feedback, for example, can be represented from the accelerator or the steer. In this case, the controller 130 dynamically and sequentially changes the time of duration, interval and intensity of vibration.

For example, when the safety is high, the controller 130 performs control such that a cycle of "1-second vibration and 2-second stop" is repeated. On the other hand, when the safety is under a threshold, the controller 130 may perform control such that a cycle of "2.5-second vibration and 0.5-second representation" is repeated and change the ratio of the time of vibration according to the degree of lowering of the safety. Alternatively, the controller 130 can have tight intervals like "0.25-second vibration and 0.5-second stop".

Subsequently, superimposition of environment sound on a synthetic sound according to the embodiment will be described. The controller 130 according to the embodiment is able to perform, in addition to the synthetic sound outputting control, control on superimposition of environment sound on the synthetic sound. In this case, the controller 130 according to the embodiment is able to dynamically control the balance between the synthetic sound and environment sound and realize various types of notification and production by controlling an amount of incorporation of environment sound according to an amount of change in the state.

For example, the controller 130 according to the embodiment may dynamically change the synthetic sound outputting mode and the amount of incorporation of environment sound according to an amount of change in a relative position between the information processing apparatus 10 and a subject. The aforementioned subject includes another object that approaches the information processing apparatus 10.

Figure 12A:
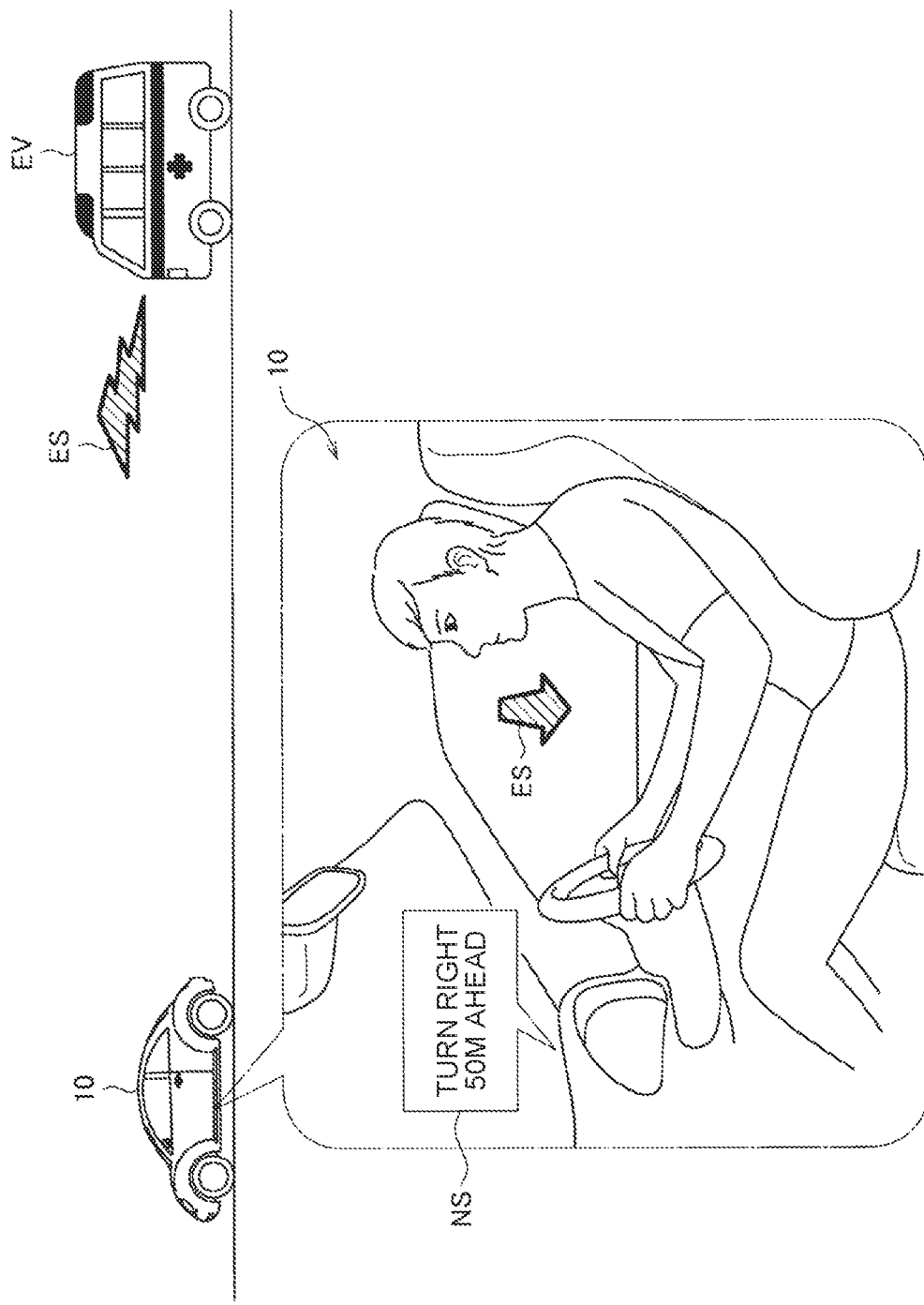
FIG. 12A is a diagram for explaining environment sound superimposition control according to approach of a subject according to the embodiment.

FIGS. 12A and 12B are diagrams for explaining environment sound superimposition control based on approach of a subject according to the embodiment. In the upper part in FIG. 12A, the situation in which an emergency vehicle EV that is the aforementioned subject is approaching the information processing apparatus 10 that is the mobile object is illustrated.

There is still a sufficient distance between the information processing apparatus 10 and the emergency vehicle EV and thus the controller 130 may, as illustrated in the lower part in FIG. 12A, control the volume of navigation sound NS and an amount of incorporation of environment sound ES, such as sirens produced by the emergency vehicle EV, in the same manner as in the normal state.

On the other hand, in the upper part in FIG. 12B, the situation in which the emergency vehicle EV is further approaching the mobile object and the distance between the mobile object and the emergency vehicle EV is under a threshold is illustrated.

In this case, the controller 130 according to the embodiment performs control such that audibility of the environment sound ES, such as sirens or instruction sound that are produced by the emergency vehicle EV. The controller 130, for example, is able to create a situation in which the user easily hears the environment sound ES by lowering the volume of the navigation sound NS and increasing the amount of incorporation of the environment sound ES. In the above description, an example of the case where the mobile object is an automobile is represented and, alternatively, the mobile object according to the embodiment may be a bicycle, or the like. In the case of a bicycle, increasing the amount of incorporation of environment sound is expected to have an effect that the user promptly notices an approaching vehicle and prevents a risk, etc.

Figure 13A:
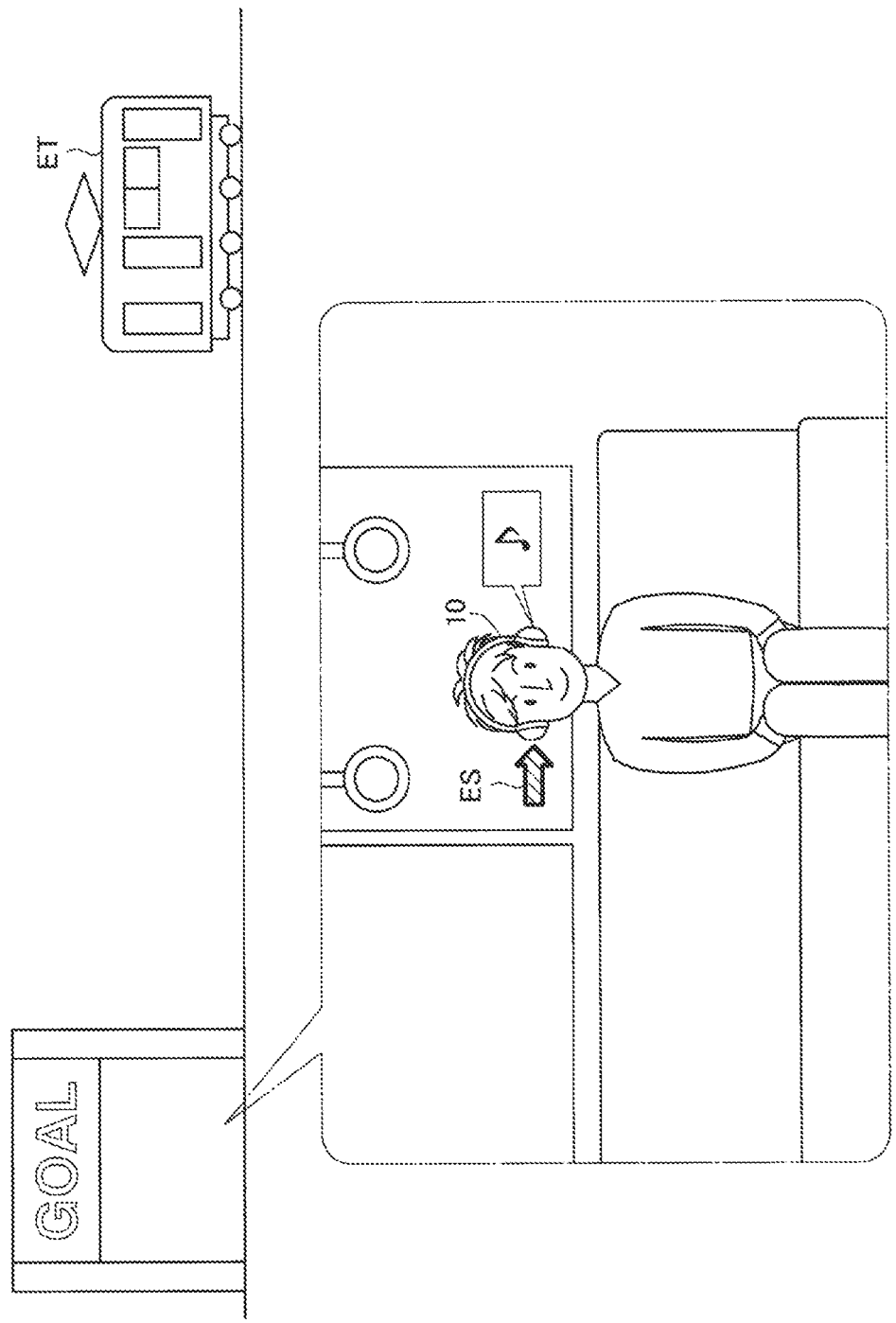
FIG. 13A is a diagram for explaining the environment sound superimposition control in the case where the information processing apparatus is an ear-worn terminal device according to the embodiment.
Figure 13B:
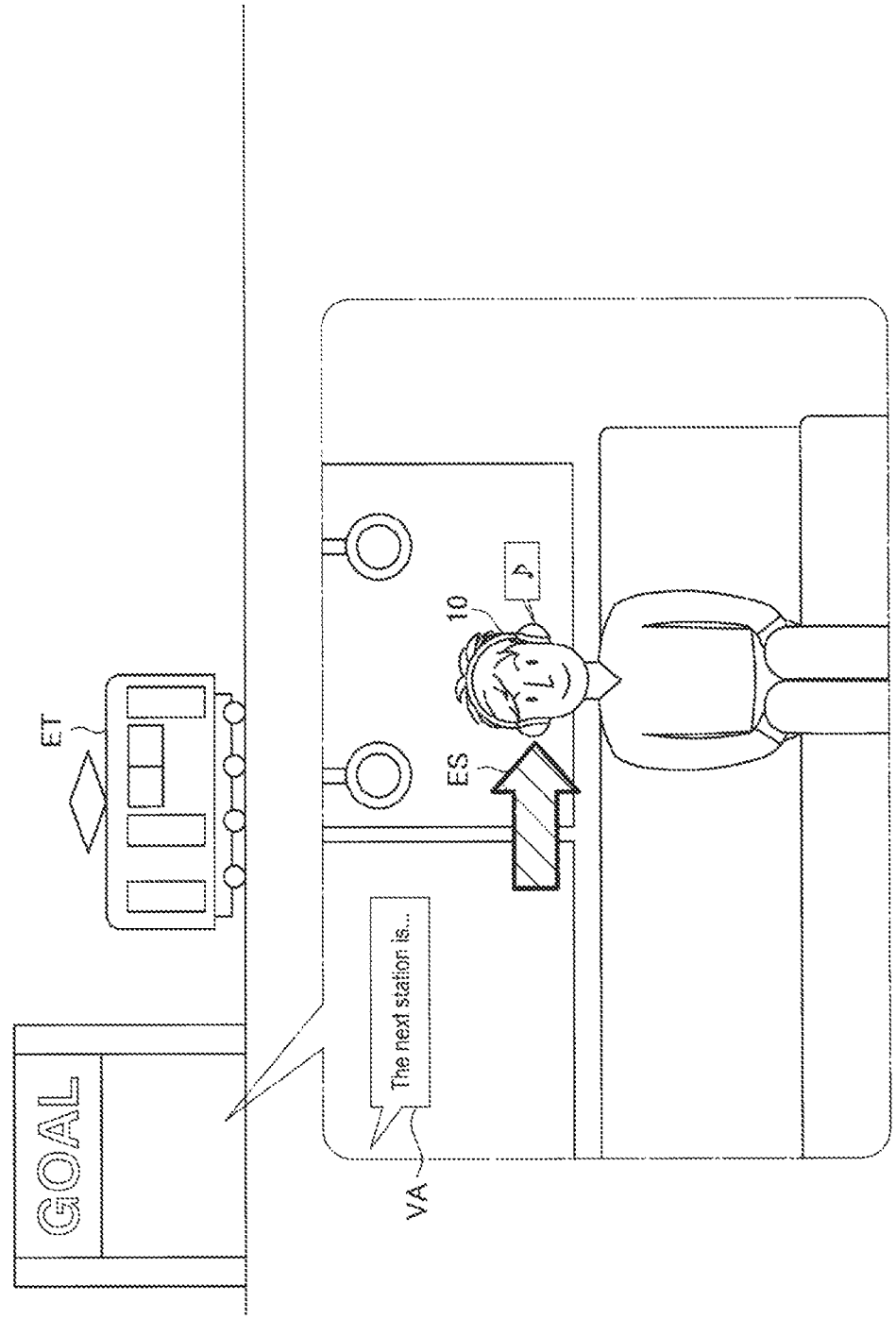
FIG. 13B is a diagram for explaining the environment sound superimposition control in the case where the information processing apparatus is an ear-worn terminal device according to the embodiment.

Such environment sound superimposition control as the above-described one is also applicable to apparatuses other than mobile objects. FIGS. 13A and 13B are diagrams for explaining environment sound superimposition control in the case where the information processing apparatus 10 according to the embodiment is an ear-worn terminal device.

FIGS. 13A and 13B illustrate the situation in which a user who is wearing the information processing apparatus 10 that is implemented as an ear-worn terminal device, such as headphones or earphones, is getting into an electric train ET.

In the example illustrated in FIG. 13A, the situation in which the distance between the electric train ET into which the user gets and a station that is the destination of the user is still sufficient is illustrated. In this case, the controller 130 according to the embodiment may, based on the fact that the distance between the station that is a subject and the information processing apparatus 10 is above a threshold, control the volume of music that is played by the audio output unit 140 and the amount of incorporation of environment sound ES in the same manner as in the normal state.

On the other hand, in the example illustrated in FIG. 13B, the situation in which the distance between the electric train ET and the station that is the subject is under the threshold is illustrated. In this case, the controller 130 according to the embodiment is able to perform control to improve audibility of the environment sound ES including train announcement on arrival at the station and effectively prevent the user from missing the station. Specifically, the controller 130 may perform control to lower the volume of music that is played by the audio output unit 140 or increase the amount of incorporation of the environment sound ES.

The environment sound superimposition control according to the embodiment has been described. As described above, the controller 130 according to the embodiment makes it possible to dynamically control the balance between synthetic sound and environment sound and realize various types of notification and production.

2. Example of Hardware Configuration

Figure 14:
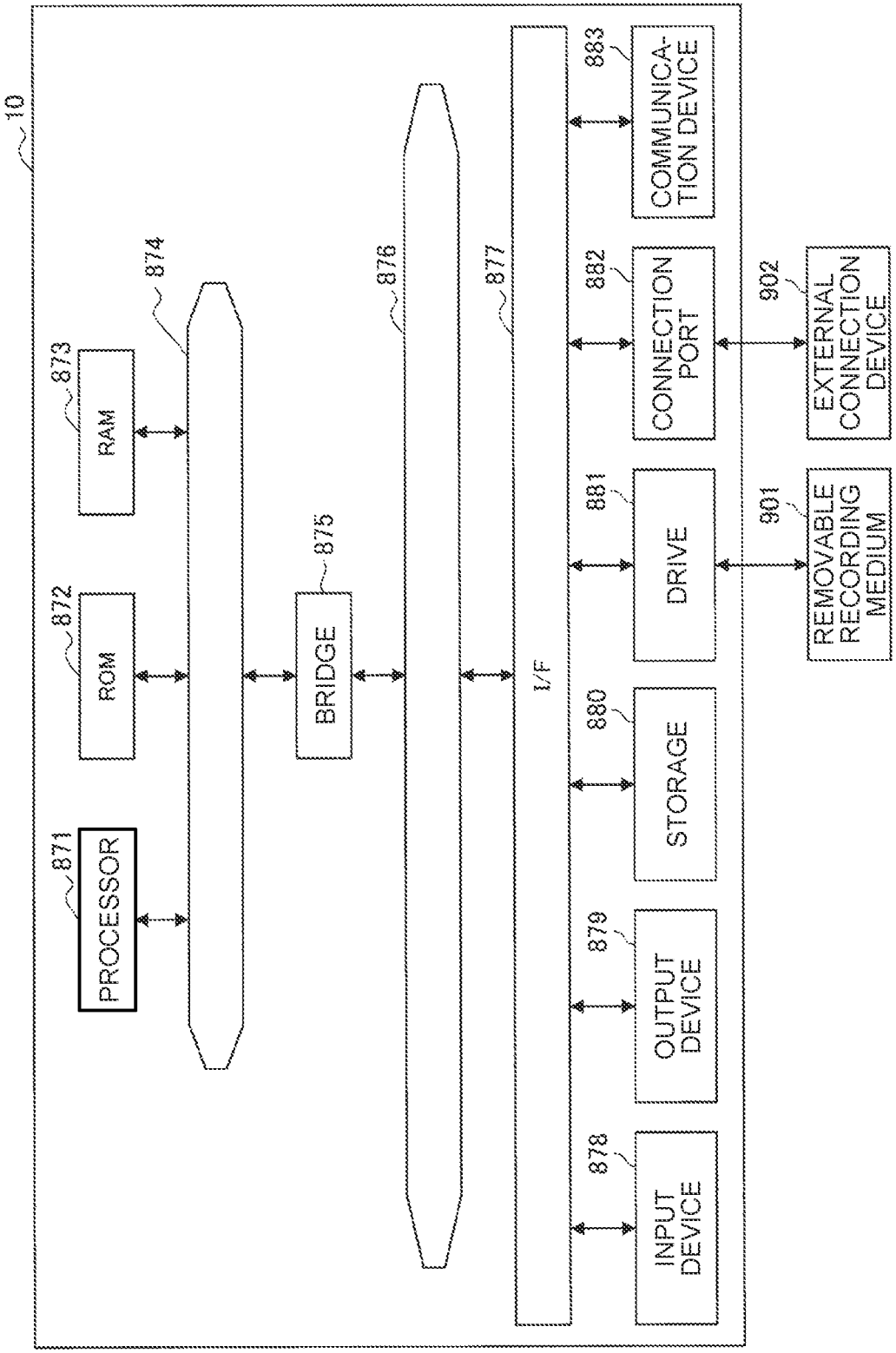
FIG. 14 is a diagram illustrating an example of a hardware configuration in the case where the information processing apparatus is implemented as an ear-worn terminal device or a smartphone according to the embodiment of the disclosure.

An example of a hardware configuration in the case where the information processing apparatus 10 according to the embodiment of the disclosure is implemented as an ear-worn terminal device or a smartphone will be described. FIG. 14 is a block diagram illustrating the example of the hardware configuration of the information processing apparatus 10 according to the embodiment of the disclosure. Referring to FIG. 14, the information processing apparatus 10, for example, includes a processor 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration illustrated herein is an example and the components may be partly omitted. Components other than the components illustrated herein may be further included.

Processor 871

The processor 871, for example, functions as an arithmetic processor or a control device and controls all or part of operations of each component according to various programs that are recorded in the ROM 872, the RAM 873, the storage 880 or a removable recording medium 901.

ROM 872 and RAM 873

The ROM 872 is a unit that stores programs to be loaded in the processor 871 and data used for computation, etc. In the RAM 873, for example, programs to be loaded in the processor 871 and various parameters that vary as appropriate when the programs are executed, etc., are temporarily or permanently stored.

Host Bus 874, Bridge 75, External Bus 876 and Interface 877

The processor 871, the ROM 872 and the RAM 873, for example, are connected to one another via the host bus 874 enabling high-rate data transmission. On the other hand, the host bus 874 is, for example, connected to the external bus 876 in which the data transmission rate is relatively low via the bridge 875. The external bus 876 is connected to various components via the interface 877.

Input Device 878

For example, a mouse, a keyboard, a touch panel, a button, a switch, a lever, etc., are used for the input device 878. Furthermore, a remote controller (hereinafter, remote) capable of transmitting a control signal by infrared rays or other radio waves may be used as the input device 878. The input device 878 also includes an audio input device, such as a microphone.

Output Device 879

The output device 879 is, for example, a device capable of visually or auditorily notifying a user of acquired information, such as a display device like a CRT (Cathode Ray Tube), a LCD or an organic EL display, an audio output device like a speaker or headphones, a printer, a mobile phone, or a facsimile machine. The output device 879 according to the disclosure includes various vibration devices capable of outputting tactile stimulation.

Storage 880

The storage 880 is a device for storing various types of data. For example, a magnetic storage device, such as a hard disk drive (HDD), a semiconductor storage device, an optical storage device, a magneto-optical storage device, or the like, may be used as the storage 880.

Drive 881

The drive 881, for example, is a device that reads information that is recorded in the removable recording medium 901, such as a magnetic disk, an optical disk, a magneto-optical disk or a semiconductor memory, or writes information in the removable recording medium 901.

Removable Recording Medium 901

The removable recording medium 901 is, for example, a DVD medium, a Blu-ray (trademark) medium, a HD DVD medium, or various types of semiconductor storage media. The removable recording medium 901 may be, for example, an IC card on which a non-contact IC chip is mounted, or an electric device.

Connection Port 882

The connection port 882 is, for example, a port for connecting an external connection device 902, such as a USB (Universal Serial Bus) port, an IEEE1394 port, a SCSI (Small Computer System Interface), a RS-232C port or an optical audio terminal.

External Connection Device 902

The external connection device 902 is, for example, a printer, a portable music player, a digital camera, a digital video camera or an IC recorder.

Communication Device 883

The communication device 883 is a communication device for connecting to a network and is, for example, a wired or wireless LAN, a communication card for Bluetooth (trademark) or WUSB (Wireless USB), a router for optical communication, a router for ADSL (Asymmetric Digital Subscriber Line), or a modem for various types of communication.

3. Summary

As described above, the information processing apparatus 10 according to the embodiment of the disclosure includes the controller 130 that controls outputting of sound performed by the apparatus based on a detected state of the apparatus. The controller 130 according to the embodiment of the disclosure has a characteristic in sequentially changing a mode of outputting a synthetic sound that can be output by the apparatus when the apparatus is in the normal state according to an amount of change in the state. The configuration enables the user to perceive the state of the apparatus by making more natural sound output.

The preferable embodiment of the disclosure has been described in detail with reference to the accompanying drawings; however, the technical scope of the disclosure is not limited to the examples. It is obvious that those with general knowledge in the technical field of the disclosure can reach various modification examples or correction examples within the scope of technical idea described in the claims and it is understood that they naturally belong to the technical scope of the disclosure.

For example, the information processing apparatus 10 according to the embodiment of the disclosure is able to lead the user into a relaxed state or deeper sleep by sensing the state of a human body (such as breathing, brain waves, pulsation, and body temperature) and dynamically mixing environment sound, environment production sound and noise based on the amount of change in the state. For example, when the user is in an arousal state, the controller 130 is able to make the user less conscious of external noise and naturally lead the user to deep sleep by having the user hear white noise components being mixed.

The effects disclosed herein are explanatory and exemplary only and thus are not definitive. In other words, the technique according to the disclosure can achieve, together with the above-described effect or instead of the above-described effect, other effects obvious to those skilled in the art from the description herein.

It is also possible to create a program for causing hardware, such as a CPU, a ROM, or a RAM, that is incorporated in a computer to implement a function equivalent to that of the configuration of the information processing apparatus 10 and a computer-readable recording medium in which the program is recorded can be provided.

Each step of the processes performed by the information processing apparatus 10 herein need not necessarily be processed chronologically in the order illustrated in the flowcharts. For example, each step according to the processes performed by the information processing server 20 may be processed in an order different from that illustrated in the flowcharts or may be processed parallelly.

The following configuration also belongs to the technical scope of the disclosure.

(1)

An information processing apparatus comprising a controller configured to, based on a detected state of the apparatus, control outputting of sound that is performed by the apparatus, wherein the controller is configured to, according to an amount of change in the state, sequentially change a mode of outputting a synthetic sound that can be output by the apparatus in a normal state.

(2)

The information processing apparatus according to (1), wherein the controller is configured to, when the amount of change reaches a predetermined threshold, output the synthetic sound in an outputting mode corresponding to the threshold.

(3)

The information processing apparatus according to (1) or (2), wherein the state includes a load on the apparatus that changes because of a behavior of a user toward the apparatus and the controller is configured to, according to an amount of change in the load, sequentially change the mode of outputting the synthetic sound.

(4)

The information processing apparatus according to (3), wherein the apparatus includes a robot apparatus, and the controller is configured to, according to the amount of change in the load that changes because of contact with the robot apparatus that is made by the user, sequentially change a mode of outputting a sound that can be output by the robot apparatus in the normal state.

(5)

The information processing apparatus according to (4), wherein the robot apparatus has a deformable structure whose shape is deformable in at least part of an exterior, and the controller is configured to, according to an amount of change in the load associated with contact with the deformable structure that is made by the user, dynamically change the mode of outputting the sound.

(6)

The information processing apparatus according to (5), wherein the deformable structure includes at least any one of a flexible material and indirectness.

(7)

The information processing apparatus according to any one of (1) to (6), wherein the state includes a position of the apparatus, and the controller is configured to, according to an amount of change in the position, sequentially change the mode of outputting the synthetic sound.

(8)

The information processing apparatus according to (7), wherein the position includes a relative position between the apparatus and a specified place, and the controller is configured to, according to the amount of change in the relative position, dynamically change the mode of outputting the synthetic sound.

(9)

The information processing apparatus according to any one of (1) to (8), wherein the controller is configured to control superimposition of environment sound onto the synthetic sound.

(10)

The information processing apparatus according to (9), wherein the controller is configured to, according to the amount of change in the condition, change an amount of incorporation of the environment sound.

(11)

The information processing apparatus according to (9) or (10), wherein the controller is configured to, according to an amount of change in a relative position between the apparatus and a subject, dynamically change the mode of outputting the synthetic sound and an amount of incorporation of the environment sound.

(12)

The information processing apparatus according to (10) or (11), wherein the controller is configured to, when a distance between the apparatus and a subject is under a threshold, perform control to improve audibility of the environment sound.

(13)

The information processing apparatus according to any one of (1) to (12), wherein the controller is configured to, according to the amount of change in the state, sequentially change a parameter relating to synthesis of the synthetic sound.

(14)

The information processing apparatus according to (13), wherein the controller is configured to change a parameter relating to at least any one of an oscillator, a modulator, a pitch controller, a filter, and an amplifier.

(15)

The information processing apparatus according to any one of (1) to (14), wherein the controller is configured to, according to a behavior of a user toward the apparatus, output the synthetic sound in a different outputting mode.

(16)

The information processing apparatus according to any one of (1) to (15), wherein the controller is configured to further control an action of the apparatus.

(17)

The information processing apparatus according to (16), wherein the controller is configured to cause the apparatus to stop an action when contact with the apparatus that is made by the user is detected.

(18)

The information processing apparatus according to (17), wherein the controller is configured to stop an action with a given direction of motion according to a direction in which the contact made by the user is detected.

(19)

An information processing method comprising:
by a processor, based on a detected state of an apparatus, controlling outputting of sound that is performed by the apparatus,
wherein the controlling includes, according to an amount of change in the state, sequentially changing a mode of outputting a synthetic sound that can be output by the apparatus in a normal state.

(20)

A program for causing a computer to function as an information processing apparatus comprising a controller configured to, based on a detected state of the apparatus, control outputting of sound that is performed by the apparatus,
wherein the controller is configured to, according to an amount of change in the state, sequentially change a mode of outputting a synthetic sound that can be output by the apparatus in a normal state.

REFERENCE SIGNS LIST

10 INFORMATION PROCESSING APPARATUS
110 AUDIO INPUT UNIT
120 SENSOR UNIT
130 CONTROLLER
140 AUDIO OUTPUT UNIT
150 DRIVER

The invention claimed is:

1. An information processing apparatus, comprising:
a controller configured to, based on a detected state of the information processing apparatus, outputting of a synthetic sound which is outputted by the information processing apparatus in normal state,
wherein the control of the output of the synthetic sound comprises sequentially change a mode of the synthetic sound outputted by the information processing apparatus in the normal state based on an amount of change in the detected state of the information processing apparatus.

2. The information processing apparatus according to claim 1, wherein the controller is further configured to, when the amount of change in the detected state reaches a specific threshold, output the synthetic sound in an outputting mode corresponding to the specific threshold.

3. The information processing apparatus according to claim 1, wherein
the detected state includes a load on the information processing apparatus that changes based on a behavior of a user toward the information processing apparatus and
the controller is further configured to sequentially change the mode of the synthetic sound based on an amount of change in the load.

4. The information processing apparatus according to claim 3, wherein
the information processing apparatus includes a robot apparatus,
the controller is further configured to sequentially change the mode of the synthetic sound output by the robot apparatus in the normal state based on the amount of change in the load, and the amount of change in the load is based on contact of the user with the robot apparatus.

5. The information processing apparatus according to claim 4, wherein
the robot apparatus has a deformable structure whose shape is deformable in at least part of an exterior of the robot apparatus, and
the controller is further configured to, dynamically change the mode of the synthetic sound based on the amount of change in the load associated with contact of the user with the deformable structure.

6. The information processing apparatus according to claim 5, wherein the deformable structure includes a flexible material.

7. The information processing apparatus according to claim 1, wherein
the detected state includes a position of the information processing apparatus, and
the controller is further configured to sequentially change the mode of the synthetic sound based on an amount of change in the position.

8. The information processing apparatus according to claim 7, wherein
the position includes a relative position between the information processing apparatus and a specified place, and
the controller is further configured to dynamically change the mode of the synthetic sound based on an amount of change in the relative position.

9. The information processing apparatus according to claim 1, wherein the controller is further configured to control superimposition of environment sound onto the synthetic sound.

10. The information processing apparatus according to claim 9, wherein the controller is further configured to change an amount of incorporation of the environment sound based on the amount of change in the detected state.

11. The information processing apparatus according to claim 9, wherein the controller is further configured to dynamically change the mode of the synthetic sound and an amount of incorporation of the environment sound based on an amount of change in a relative position between the information processing apparatus and a subject.

12. The information processing apparatus according to claim 10, wherein the controller is further configured to control audibility of the environment sound based on a distance between the information processing apparatus and a subject being less than a threshold.

13. The information processing apparatus according to claim 1, wherein the controller is further configured to sequentially change a parameter associated with the synthetic sound based on the amount of change in the detected state.

14. The information processing apparatus according to claim 13, wherein the controller is further configured to change a parameter associated with at least one of an oscillator, a modulator, a pitch controller, a filter, or an amplifier.

15. The information processing apparatus according to claim 1, wherein the controller is further configured to output the synthetic sound in a specific outputting mode based on a user behavior towards the information processing apparatus.

16. The information processing apparatus according to claim 1, wherein the controller is further configured to control an action of the information processing apparatus.

17. The information processing apparatus according to claim 16, wherein the controller is further configured to control the information processing apparatus to stop the action based on a detection of a user contact with the information processing apparatus.

18. The information processing apparatus according to claim 17, wherein the controller is further configured to stop the action with a given direction of motion based on a direction in which the user contact is detected.

19. An information processing method, comprising:
controlling, based on a detected state of an apparatus, outputting of a synthetic sound which is outputted by the apparatus in normal state,
wherein the controlling the output of the synthetic sound includes, sequentially changing a mode of the synthetic sound outputted by the apparatus in the normal state based on an amount of change in the detected state of the apparatus.

20. A non-transitory computer-readable medium having stored thereon computer implemented instructions that, when executed by an information processing apparatus, causes the information processing apparatus to execute operations, the operations:
controlling, based on a detected state of an apparatus, outputting of a synthetic sound which is outputted by the apparatus in normal state,
wherein the controlling of the output of the synthetic sound comprises sequentially change a mode of the synthetic sound outputted by the apparatus in the normal state based on an amount of change in the detected state of the apparatus.

* * * * *